US012359045B2

(12) United States Patent
Takahashi et al.

(10) Patent No.: US 12,359,045 B2
(45) Date of Patent: Jul. 15, 2025

(54) OXAZOLINE-MODIFIED POLYPROPYLENE

(71) Applicant: Sumitomo Chemical Company, Limited, Tokyo (JP)

(72) Inventors: Shun Takahashi, Ichihara (JP); Kenichi Seno, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 262 days.

(21) Appl. No.: 17/560,519

(22) Filed: Dec. 23, 2021

(65) Prior Publication Data

US 2022/0204737 A1 Jun. 30, 2022

(30) Foreign Application Priority Data

Dec. 25, 2020 (JP) ................................ 2020-216648
Sep. 14, 2021 (JP) ................................ 2021-149018

(51) Int. Cl.
*C08L 23/12* (2006.01)

(52) U.S. Cl.
CPC .......... *C08L 23/12* (2013.01); *C08L 2205/02* (2013.01)

(58) Field of Classification Search
CPC ............................ C08L 23/12; C08L 2205/02
USPC ........................................................ 524/516
See application file for complete search history.

(56) References Cited

FOREIGN PATENT DOCUMENTS

| | | | | |
|---|---|---|---|---|
| CN | 104148048 A | | 11/2014 | |
| CN | 108892856 A | | 11/2018 | |
| JP | H05-320446 A | | 12/1993 | |
| JP | H11-158386 A | | 6/1999 | |
| JP | 2002-338827 A | | 11/2002 | |
| JP | 2013-079318 A | | 5/2013 | |
| JP | 2019-196496 A | | 11/2019 | |
| WO | 2016188886 A1 | | 12/2016 | |
| WO | WO-2019056283 A1 | * | 3/2019 | C08J 3/226 |

OTHER PUBLICATIONS

Extended European Search Report issued May 25, 2022 in EP Application No. 21212345.9.

* cited by examiner

*Primary Examiner* — Ling Siu Choi
*Assistant Examiner* — Ronald Grinsted
(74) *Attorney, Agent, or Firm* — Panitch Schwarze Belisario & Nadel LLP

(57) ABSTRACT

An oxazoline useful for improving mechanical strength of a fiber-reinforced polypropylene composition is provided. The oxazoline-modified polypropylene satisfies the following requirements:

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min.

9 Claims, No Drawings

OXAZOLINE-MODIFIED POLYPROPYLENE

CROSS-REFERENCE TO RELATED APPLICATIONS

This application claims priority under 35 U.S.C. § 119(b) to Japanese Application No. 2021-149018, filed on Sep. 14, 2021 and Japanese Application No. 2020-216648, filed on Dec. 25, 2020, the disclosures of which are incorporated herein by reference in their entireties.

BACKGROUND OF THE INVENTION

Field of the Invention

The present invention relates to oxazoline-modified polypropylene, a method of producing the same, and a polypropylene composition containing oxazoline-modified polypropylene.

Description of the Related Art

A member formed of a polypropylene composition is used for an automobile member, and a member formed of a composition obtained by kneading a filler with polypropylene is used to improve mechanical strength of the member. A carbon fiber, a glass fiber, or talc is used as the filler. In addition, when polypropylene and a filler are kneaded, polypropylene modified with a coupling agent or a specific polar group is used.

For example, in WO 2016/188886 A, tensile modulus or tensile strength is improved by a composition containing polypropylene, a carbon fiber, and polypropylene grafted with maleic anhydride as a coupling agent.

SUMMARY OF THE INVENTION

An object of the present invention is to provide a substance useful for improving mechanical strength of a fiber-reinforced polypropylene composition.

The present inventors have found the present invention by focusing on 1) usefulness of modified polypropylene for improving mechanical strength of a fiber-reinforced polypropylene composition, 2) use of oxazoline-modified polypropylene as the modified polypropylene, 3) a content of an oxazoline group in the oxazoline-modified polypropylene, and 4) a melt mass flow rate (MFR) of the oxazoline-modified polypropylene.

In addition, the present inventors have found the present invention by focusing on 5) melting and kneading polypropylene, an organic peroxide, and maleic acid or maleic anhydride to obtain a melt-kneaded product, and 6) adding an oxazoline compound to the obtained melt-kneaded product of the polypropylene, the organic peroxide, and the maleic acid or maleic anhydride to obtain a mixture and melting and kneading the mixture.

The present invention relates to the following inventions, but is not limited thereto.

Invention 1

Oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min.

Invention 2

Oxazoline-modified polypropylene produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

Invention 3

A method of producing oxazoline-modified polypropylene, the method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

Invention 4

A polypropylene composition containing the following (component 1):

(component 1) oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min.

Invention 5

A polypropylene composition containing the following (component 1):

(component 1) oxazoline-modified polypropylene produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

Invention 6

The polypropylene composition according to Invention 4 or 5, further containing the following (component 2) and (component 3), (component 2) polypropylene; and (component 3) at least one filler selected from the group consisting of a carbon fiber, a glass fiber, and talc, in which a content of the (component 1) is 1 to 20 mass %, a content of the (component 2) is 30 to 98 mass %, and a content of the (component 3) is 1 to 50 mass %.

Invention 7

The polypropylene composition according to any one of Inventions 4 to 6, further containing a carbon fiber as a (component 3) filler.

The oxazoline-modified polypropylene has the features of the present invention, such that a polypropylene composition containing the oxazoline-modified polypropylene and a filler and a molded article containing the composition have improved mechanical strength.

Definition

All numbers disclosed herein are approximate values, regardless whether the word "about" or "approximate" is used in connection therewith. The number may vary by 1 percent, 2 percent, 5 percent, or sometimes, 10 to 20 percent. Whenever a numerical range with a lower limit $R^L$ and an upper limit $R^U$ is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, that is, k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The description of "a lower limit to an upper limit" indicating a numerical range denotes "a lower limit or more and an upper limit or less", and the description of "an upper limit to a lower limit" indicating a numerical range denotes "an upper limit or less and a lower limit or more". That is, these descriptions denote numerical ranges including the lower limit and the upper limit.

Hereinafter, some embodiments of the present invention will be described in detail. However, the present invention is not limited to the following embodiments.

Oxazoline-Modified Polypropylene

The term "oxazoline-modified polypropylene" refers to polypropylene modified with an oxazoline compound and having an oxazoline group. The oxazoline-modified polypropylene of the present invention satisfies the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min.

The "oxazoline group" may refer to an oxazoline group itself or a ring-opened oxazoline group. The oxazoline group may have a substituent.

As described above, a content of the oxazoline group in 1 g of the oxazoline-modified polypropylene is in a range of $0.1\times10^{-2}$ to $100\times10^{-2}$ mmol/g, a lower limit value of the range is preferably $1.0\times10^{-2}$ mmol/g and more preferably $2.5\times10^{-2}$ mmol/g, and an upper limit value of the range is preferably $25\times10^{-2}$ mmol/g and more preferably $17\times10^{-2}$ mmol/g. The range is preferably $1.0\times10^{-2}$ to $25\times10^{-2}$ mmol/g and more preferably $2.5\times10^{-2}$ to $17\times10^{-2}$ mmol/g.

The content of the oxazoline group in 1 g of the oxazoline-modified polypropylene is determined by infrared (IR) spectroscopy. For example, in a case where oxazoline-modified polypropylene is produced by modifying maleic anhydride-modified polypropylene with an oxazoline compound, the content is determined by the method described in Examples.

As described above, a melt mass flow rate of the oxazoline-modified polypropylene is 0.01 to 300 g/10 min, preferably 0.1 to 300 g/10 min, and more preferably 0.8 to 180 g/10 min.

The "melt mass flow rate" refers to a melt mass flow rate measured at a measurement temperature of 230° C. and a load of 2.16 kg according to a method specified in JIS K 7210.

Method of Producing Oxazoline-Modified Polypropylene

The oxazoline-modified polypropylene of the present invention may be produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

In addition, when the oxazoline-modified polypropylene of the present invention is produced, polypropylene and/or at least one filler may be contained.

Oxazoline Compound

An example of the oxazoline compound can include a compound of Formula 1 having two oxazoline groups.

[Chem. 1]

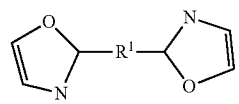

(1)

$R^1$ represents a divalent organic group, and examples thereof can include an alkylene group such as a methylene group ($-CH_2-$), an ethylene group ($-CH_2CH_2-$), or a propylene group ($-CH_2CH_2CH_2-$), an alkenylene group such as an ethenylene group ($-CH{=}CH-$) or a propenylene group ($-CH{=}CH-CH_2-$), a phenylene group such as a 1,2-phenylene group, a 1,3-phenylene group, or 1,4-phenylene group, and

[Chem. 2]

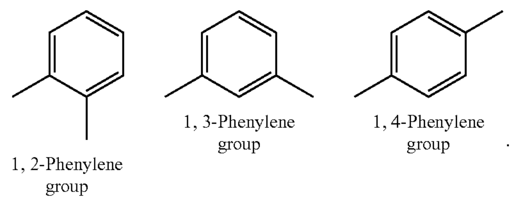

The kneading method is not particularly limited, and examples thereof can include a method of simultaneously or sequentially supplying and kneading polypropylene, an organic peroxide, maleic acid or maleic anhydride, and an oxazoline compound to and in, for example, a Henschel mixer, a V-type blender, a tumbler blender, a ribbon blender, or the like and then performing melting and kneading with a single screw extruder, a multiple screw extruder, a kneader, a Banbury mixer, or the like. Specifically, it is preferable to use an apparatus excellent in a kneading performance such as a single screw extruder, a multiple screw extruder, a kneader, or a Banbury mixer to more uniformly disperse the respective components.

In order to supply polypropylene, an organic peroxide, maleic acid or maleic anhydride, and an oxazoline compound to an extruder, it is possible to adopt any method of:

1) a method in which an extruder is equipped with three hoppers, along a flow of a resin, polypropylene is supplied from a first hopper, an organic peroxide and maleic acid or maleic anhydride are supplied together from a second hopper, and an oxazoline compound is supplied from a third hopper, 2) a method in which an extruder is equipped with two hoppers, along a flow of a resin, polypropylene, an organic peroxide, and maleic acid or maleic anhydride are supplied together from a first hopper, and an oxazoline compound is supplied from a second hopper, and 3) a method in which an extruder is equipped with two hoppers, along a flow of a resin, polypropylene, an organic peroxide, and maleic acid or maleic anhydride are supplied together from a first hopper, and an organic peroxide, an oxazoline compound, and maleic acid or maleic anhydride are supplied together from a second hopper.

A temperature at which the respective components are melted and kneaded is preferably equal to or higher than the highest melting point of the melting points of the respective components to be mixed. Specifically, the melt-kneading is performed in a range of preferably 120 to 300° C., more preferably 180 to 280° C., and still more preferably 200 to 270° C.

Polypropylene Composition

A polypropylene composition of the present invention contains oxazoline-modified polypropylene of the present invention (also referred to as a "component 1").

The polypropylene composition of the present invention may contain at least one component selected from the group consisting of polypropylene (also referred to as a "component 2"), a filler (also referred to as a "component 3"), and another modified polypropylene (also referred to as a "component 4").

In one aspect, the polypropylene composition of the present invention contains a "component 2" and a "component 3". In one aspect, the polypropylene composition of the present invention may further contain a "component 4".

Polypropylene (Component 2)

Examples of the polypropylene (component 2) can include the following:

a propylene homopolymer;

a propylene-ethylene random copolymer;

a propylene-α-olefin random copolymer;

a propylene-ethylene-α-olefin copolymer; and a heterophasic propylene polymerization material composed of a propylene homopolymer component or a copolymer component composed mainly of propylene (hereinafter, referred to also as a polymer component I) and a copolymer obtained by copolymerizing propylene and at least one monomer selected from ethylene and α-olefin (hereinafter, also referred to as a polymer component II).

These polypropylenes may be used alone or in combination of two or more thereof.

As the α-olefin used in the component 2, 1-butene, 1-pentene, 1-hexene, 4-methyl-1-pentene, 1-octene, or 1-decene is preferred, and 1-butene, 1-hexene, or 1-octene is more preferred.

Examples of the propylene-α-olefin random copolymer can include a propylene-1-butene random copolymer, a propylene-1-hexene random copolymer, and a propylene-1-octene random copolymer.

Examples of the propylene-ethylene-α-olefin copolymer can include a propylene-ethylene-1-butene copolymer, a propylene-ethylene-1-hexene copolymer, and a propylene-ethylene-1-octene copolymer.

A content of the ethylene or the α-olefin contained in the propylene-ethylene random copolymer, the propylene-α-olefin random copolymer, or the propylene-ethylene-α-olefin copolymer is generally 0.01 to 30 wt % and preferably 0.1 to 20 wt %. Here, a total amount of the copolymer is 100 wt %.

In a case where the polymer component I in the heterophasic propylene polymerization material is a copolymer component composed mainly of propylene, ethylene and at least one olefin selected from a-olefins having 4 to 12 carbon atoms are contained in the polymer component I, and a content thereof is generally 0.01 to 30 wt %. Here, a total amount of the polymer component I is 100 wt %.

In a case where the polymer component I is a copolymer component composed mainly of propylene, examples of the polymer component I can include a propylene-ethylene copolymer component, a propylene-1-butene copolymer component, and a propylene-1-hexene copolymer component.

Examples of the polymer component II in the heterophasic propylene polymerization material can include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene-1-octene copolymer component.

A content of ethylene and at least one olefin selected from α-olefins having 4 to 12 carbon atoms contained in the polymer component II is generally 1 to 80 wt %, preferably 20 to 70 wt %, and more preferably 30 to 60 wt %. Here, a total amount of the polymer component II is 100 wt.

A content of the polymer component II contained in the heterophasic propylene polymerization material is generally 1 to 70 wt %, preferably 5 to 50 wt %, and more preferably 10 to 40 wt %. Here, a total amount of the propylene block copolymer is 100 wt %.

Examples of the heterophasic propylene polymerization material composed of the polymer component I and the polymer component II can include the following:

a (propylene)-(propylene-ethylene) polymerization material;

a (propylene)-(propylene-ethylene-1-butene) polymerization material;

a (propylene)-(propylene-ethylene-1-hexene) polymerization material;

a (propylene)-(propylene-1-butene) polymerization material;

a (propylene)-(propylene-1-hexene) polymerization material;

a (propylene-ethylene)-(propylene-ethylene) polymerization material;

a (propylene-ethylene)-(propylene-ethylene-1-butene) polymerization material;

a (propylene-ethylene)-(propylene-ethylene-1-hexene) polymerization material;

a (propylene-ethylene)-(propylene-1-butene) polymerization material;

a (propylene-ethylene)-(propylene-1-hexene) polymerization material;

a (propylene-1-butene)-(propylene-ethylene) polymerization material;

a (propylene-1-butene)-(propylene-ethylene-1-butene) polymerization material;

a (propylene-1-butene)-(propylene-ethylene-1-hexene) polymerization material;

a (propylene-1-butene)-(propylene-1-butene) polymerization material; and a (propylene-1-butene)-(propylene-1-hexene) polymerization material.

Filler (Component 3)

Examples of the filler (component 3) can include the following.

Carbon Fiber (Component 3-1)

Various types of carbon fiber known in the related art can be used as the carbon fiber (component 3-1). Specifically, examples of the carbon fiber can include polyacrylonitrile-based carbon fiber, rayon-based carbon fiber, pitch-based carbon fiber, polyvinyl alcohol-based carbon fiber, regenerated cellulosic carbon fiber, and pitch-based carbon fiber produced from mesophase pitch.

In addition, a recycled carbon fiber can be used as a carbon fiber (component 3-1). Specifically, a recycled carbon fiber to be reused can be used by firing a carbon fiber used in an aircraft or the like.

A fiber diameter of the component 3-1 is not particularly limited, and is preferably 3 μm or more and more preferably 8 μm or more, to reinforce the fiber, to improve productivity of a reinforcing fiber bundle, to reduce the time and effort required to connect the fiber bundles at the time of continuous production of pellets, and to improve productivity of the fiber. In addition, in order to increase an aspect ratio of the fiber in a case where a pellet length is fixed, the fiber diameter is preferably 30 μm or less and more preferably 20 μm or less.

An aspect ratio of the component 3-1 is not particularly limited, and is preferably 5 or more to reinforce the fiber. In addition, the aspect ratio is preferably 6,000 or less to improve moldability. The aspect ratio of the component 3-1 can be calculated from an average fiber diameter and an average fiber length according to the formula of (average fiber length)/(average fiber diameter).

As a raw material of the component 3-1, a continuous fiber bundle is used, and this is commercially available as a tow. In general, an average fiber diameter thereof is 3 to 30 μm, and the number of filament bundles is 500 to 24,000. Preferably, the average fiber diameter is 4 to 10 μm, and the number of bundles is 6,000 to 15,000.

In addition, a chopped strand can be used as the component 3-1. A length of the chopped strand is generally 1 to 20 mm, a diameter of the fiber is about 3 to 30 μm and preferably 4 to 10 μm.

A fiber length of the component 3-1 constituting the carbon fiber-containing polypropylene composition of the present invention is generally 0.05 to 200 mm, preferably 0.2 to 50 mm, and more preferably 4 to 20 mm.

An average aspect ratio (fiber length/fiber diameter) is generally 5 to 6,000, preferably 10 to 3,000, and more preferably 15 to 2,000.

A surface of the component 3-1 is preferably subjected to a surface treatment by oxidative etching, coating, or the like. Examples of the oxidative etching treatment can include an air oxidation treatment, an oxygen treatment, a treatment with oxidizing gas, a treatment with ozone, a corona treatment, a flame treatment, an (atmospheric pressure) plasma treatment, and a treatment with an oxidizing liquid (nitric acid, an aqueous solution of an alkali metal salt of hypochlorous acid, potassium dichromate-sulfuric acid, or potassium permanganate-sulfuric acid). Examples of a substance that covers the carbon fiber can include carbon, silicon carbide, silicon dioxide, silicon, a plasma monomer, ferrocene, and iron trichloride.

In addition, if necessary, urethane-based, olefin-based (polypropylene or the like), acryl-based, nylon-based, butadiene-based, epoxy-based (including special epoxy), and polyester-based sizing agents may be used.

Surface of Carbon Fiber

The carbon fiber (component 3-1) contained in the carbon fiber-containing polypropylene composition of the present invention has a surface containing a predetermined amount of each of a C—O bond, a C═O bond, an O—C═O bond, a C—C bond, and a C—N bond so as to increase mechanical strength of the polypropylene composition. In all of the above and following aspects, the "C—O bond" does not include a C—O bond in the "O—C═O bond", and the "C═O bond" does not include a C═O bond in the "O—C═O bond".

In an aspect, the component 3-1 contains a C—C bond, a C═O bond, an O—C═O bond, a C—C bond, and a C—N bond. A content of the C—O bond is 1 to 24%, preferably 3 to 20%, and more preferably 5 to 15%, with respect to 100% of a total spectrum area of the C—O bond, the C═O bond, the O—C═O bond, the C—C bond, and the C—N bond.

In an aspect, the component 3-1 contains a C—O bond, a C═O bond, an O—C═O bond, a C—C bond, and a C—N bond. A total content of the C═O bond and the O—C═O bond is 4 to 15%, preferably 5 to 12%, and more preferably 5 to 8%, with respect to 100% of a total spectrum area of the C—O bond, the C═O bond, the O—C═O bond, the C—C bond, and the C—N bond.

In an aspect, the component 3-1 contains a C—O bond, a C═O bond, an O—C═O bond, a C—C bond, and a C—N bond. A content of the C—O bond is 5 to 24%, preferably 3 to 20%, and more preferably 5 to 15%, with respect to 100% of a total spectrum area of the C—O bond, the C═O bond, the O—C═O bond, the C—C bond, and the C—N bond. A total content of the C═O bond and the O—C═O bond is 4 to 15%, preferably 5 to 12%, and more preferably 5 to 8%, with respect to 100% of the total spectrum area of the C—O bond, the C═O bond, the O—C═O bond, the C—C bond, and the C—N bond.

Method of Calculating Bond Component in Surface of Carbon Fiber

The bond amount of each component in the surface of the carbon fiber can be measured by an X-ray photoelectron spectrometer. Before the measurement, a pre-treatment such as removing of an unreacted sizing agent may be performed, if necessary.

A characteristic X-ray such as a monochromatic Al Kα ray (1,486.6 eV) or Mg Kα ray (1,253.6 eV) can be used as an excitation source.

The obtained spectrum can be waveform-separated for each bond by a known method.

For example, the amount of each bond component in the surface of the carbon fiber can be calculated by a method described in Examples.

Glass Fiber (Component 3-2)

The polypropylene composition of the present invention may contain a glass fiber (component 3-2).

A glass fiber to be used is not particularly limited. Examples of the type of glass used for a fiber can include E glass, C glass, A glass, and S glass, and among them, E glass is preferred. A method of producing a glass fiber is not particularly limited, and a glass fiber is produced by various known production methods.

Two or more types of glass fibers may be used in combination.

A fiber diameter of the glass fiber is not particularly limited, and is usually 3 to 25 μm. A fiber length of the glass fiber is not particularly limited, and is usually 0.1 to 20 mm.

The glass fiber may be treated with a sizing agent and/or a surface treatment agent. The glass fibers can be bound by the treatment with a sizing agent.

The glass fiber is preferably subjected to a surface treatment with a surface treatment agent from the viewpoint of improving dispersibility in the polypropylene (component 2). Examples of the surface treatment agent can include an organosilane coupling agent, a titanate coupling agent, an aluminate coupling agent, a zirconate coupling agent, a silicone compound, a higher fatty acid, a higher fatty acid metal salt, and a fatty acid ester.

Examples of the organosilane coupling agent can include vinyltrimethoxysilane, γ-chloropropyltrimethoxysilane, γ-methacryloxypropyltrimethoxysilane, γ-aminopropyltrimethoxysilane, and 3-acryloxypropyltrimethoxysilane.

Examples of the titanate coupling agent can include isopropyl triisostearoyl titanate, isopropyl tris(dioctyl pyrophosphate) titanate, and isopropyl tri(N-aminoethyl)titanate.

An example of the aluminate coupling agent can include acetoalkoxyaluminum diisopropylate.

Examples of the zirconate coupling agent can include tetra(2,2-diallyloxymethyl)butyl, di(tridecyl)phosphite zirconate, and neopentyl(diallyl)oxy trineodecanoyl zirconate.

Examples of the silicone compound can include silicone oil and a silicone resin.

Examples of the higher fatty acid can include oleic acid, capric acid, lauric acid, palmitic acid, stearic acid, montanic acid, linoleic acid, rosin acid, linolenic acid, undecanoic acid, and undecenoic acid.

Examples of the higher fatty acid metal salt can include a sodium salt, a lithium salt, a calcium salt, a magnesium salt, a zinc salt, and an aluminum salt of a fatty acid (for example, stearic acid or montanic acid) having 9 to 30 carbon atoms. Among them, calcium stearate, aluminum stearate, calcium montanate, and sodium montanate are preferred.

Examples of the fatty acid ester can include esters of fatty acids having 9 to 30 carbon atoms, and specific examples of the fatty acid ester can include polyhydric alcohol fatty acid ester such as glycerin fatty acid ester, α-sulfo fatty acid ester, polyoxyethylene sorbitan fatty acid ester, sorbitan fatty acid ester, polyethylene fatty acid ester, and sucrose fatty acid ester.

A use amount of the surface treatment agent is not particularly limited. The use amount of the surface treatment agent is preferably 0.01 parts by weight to 5 parts by weight, and more preferably 0.1 parts by weight to 3 parts by weight, with respect to 100 parts by weight of the glass fiber.

Examples of the sizing agent can include an epoxy-based sizing agent, an aromatic urethane-based sizing agent, an aliphatic urethane-based sizing agent, an acrylic sizing agent, and a maleic anhydride-modified polyolefin-based sizing agent.

As the sizing agent, a sizing agent that melts at a temperature in a process of producing a polypropylene composition is preferred, and a sizing agent that melts at 200° C. or lower is more preferred.

As the glass fiber, a so-called chopped strand obtained by cutting a glass strand may be used.

As the glass fiber, resin pellets containing glass fibers (glass fiber-containing resin pellets) may be used. In such glass fiber-containing pellets, the length of the glass fiber (fiber length) is usually substantially the same as the length of the glass fiber-containing pellet in an extrusion direction.

The glass fiber-containing pellets can be produced by any appropriate production method known in the related art using any appropriate resin known in the related art selected in consideration of the composition and the like of the polypropylene composition to be produced.

The glass fiber-containing pellets can be produced by, for example, a pultrusion molding method. The pultrusion molding method is a method in which a resin is impregnated with a bundle of glass fibers by melt-extruding any appropriate resin known in the related art that is a material for a glass fiber-containing resin pellet from an extruder while drawing out a plurality of continuous glass fibers, and the bundle of glass fibers impregnated in the resin is cooled and cut with a pelletizer to integrate the plurality of glass fibers.

A content of the glass fibers in the glass fiber-containing pellets is preferably 50 to 99.9 mass %.

As the glass fiber, a glass fiber having a water-soluble base component amount of 0.1 mmol/g or less and a water-soluble weak acid salt amount of 0.1 mmol/g or less can be selected from commercially available products. Specific examples of the commercially available products can include "CS-249A-10C" (trade name, manufactured by Owens Corning), "ECS10-03-508H" (trade name, manufactured by JUSHI JAPAN CO., LTD.), and "T480H" (trade name, manufactured by Nippon Electric Glass Co., Ltd.).

Talc (Component 3-3)

The polypropylene composition of the present invention may contain talc (component 3-3) which is a silicate mineral.

The polypropylene composition of the present invention may contain one or two or more types of talc.

The shape of talc may be a plate shape, a needle shape, or a fiber shape. Talc having a plate shape is preferred from the viewpoint of rigidity, impact resistance, and dimensional stability of a molded article.

An average particle diameter D50[L] of talc is preferably 20.0 μm or less, and more preferably 15.0 μm or less, from the viewpoint of rigidity, impact resistance, and dimensional stability of a molded article. The average particle diameter D50[L] of talc may be 2.0 μm or more or 4.0 μm or more. An average particle diameter D50[L] of a component C is preferably 2.0 to 20.0 μm and more preferably 4.0 to 15.0 μm.

An average particle diameter D50[S] of talc is preferably 5.0 μm or less, and more preferably 3.0 μm or less, from the viewpoint of rigidity, impact resistance, and dimensional stability of a molded article.

An average particle diameter D50[S] of the component C may be 0.5 μm or more or 1.0 μm or more. The average particle diameter D50[S] of the component C is preferably 0.5 to 5.0 μm and more preferably 1.0 to 3.0 μm.

A ratio of the average particle diameter D50[L] of talc to the average particle diameter D50[S] of talc (D50[L]/D50[S]) may be 1.5 or more or 2.5 or more, from the viewpoint of rigidity and dimensional stability of a molded article. D50[L]/D50[S] may be 10 or less or 8 or less. D50[L]/D50[S] may be 1.5 to 10, 1.5 to 8, 2.5 to 10, or 2.5 to 8.

The "average particle diameter D50[L]" is determined based a volume-based particle diameter distribution measurement data measured by a laser diffraction method according to a method specified in JIS R1629. In the particle diameter distribution measurement data, the average particle diameter D50[L] refers to a particle diameter (particle diameter equivalent to 50%) when a cumulative number of particles from a smaller particle diameter side reaches 50%. The particle diameter defined as described above is generally referred to as a "50% equivalent particle diameter" and is denoted by "D50".

In the present specification, the "average particle diameter D50[S]" is determined based a volume-based particle diameter distribution measurement data measured by a centrifugal sedimentation method according to a method specified in JIS R1619. In the particle diameter distribution measurement data, the average particle diameter D50[S] refers to a particle diameter (particle diameter equivalent to 50%) when a cumulative number of particles from a smaller particle diameter side reaches 50%.

Another Modified Polypropylene (Component 4)

The polypropylene composition of the present invention may further contain another modified polypropylene that is not the oxazoline-modified polypropylene (component 1).

Modified Polypropylene (Component 3)

The another modified polypropylene (Component 4) is not particularly limited as long as it is polypropylene modified to impart a polarity. Examples of the modified polypropylene can include an (anhydrous) carboxylic acid, epoxide, oxazoline, isocyanate, and polypropylene modified with carbodiimide or the like, and preferred examples of the modified polypropylene can include maleic anhydride-modified polypropylene, carbodiimide-modified polypropylene, and epoxy-modified polypropylene.

Maleic Anhydride-Modified Polypropylene (Polypropylene MM)

Examples of the maleic anhydride-modified polypropylene (also referred to as polypropylene MM) as the component 4 can include the following 1 to 4:

1. modified polypropylene obtained by graft-polymerizing an unsaturated carboxylic acid and/or a derivative thereof to a propylene homopolymer;
2. modified polypropylene obtained by graft-polymerizing an unsaturated carboxylic acid and/or a derivative thereof to a propylene copolymer composed of at least two monomers;
3. modified polypropylene obtained by graft-polymerizing an unsaturated carboxylic acid and/or a derivative thereof to a block copolymer obtained by copolymerizing at least two olefins after homopolymerization of propylene; and
4. modified polypropylene obtained by random-copolymerizing or block-copolymerizing an unsaturated carboxylic acid and/or a derivative thereof, propylene, and optionally, at least one olefin.

In order to produce the polypropylene MM, it is possible to use various methods described in "Practical Polymer Alloy Design" (written by Fumio Ide, published by Kogyo Chosakai Publishing Co., Ltd. (1996)), Prog. Polym. Sci., 24, 81-142 (1999), and JP-A-2002-308947. That is, any of a solution method, a bulk method, and a melt-kneading method may be used. In addition, these methods may be used in combination.

Examples of the unsaturated carboxylic acid used for producing the polypropylene MM can include maleic acid, fumaric acid, itaconic acid, acrylic acid, and methacrylic acid. In addition, examples of the derivative of the unsaturated carboxylic acid can include acid anhydride derived from the unsaturated carboxylic acid, an ester compound, an amide compound, an imide compound, and a metal salt. Specific examples of the derivative of the unsaturated carboxylic acid can include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethylester maleate, diethylester maleate, monomethylester fumarate, dimethylester fumarate, acrylamide, methacrylamide, maleic acid monoamide, maleic acid diamide, fumaric acid monoamide, maleimide, N-butylmaleimide, and sodium methacrylate. In addition, a compound, such as citric acid and malic acid, which is subjected to dehydration in a step of performing graft polymerization to polypropylene to generate an unsaturated carboxylic acid may also be used.

Glycidyl esters of acrylic acid and methacrylic acid, and maleic anhydride are preferred as the unsaturated carboxylic acid and/or the derivative thereof.

Examples of the organic peroxide used for producing polypropylene MM can include dicetyl peroxydicarbonate, di-3-methoxybutyl peroxydicarbonate, di-2-ethylhexyl peroxydicarbonate, bis(4-tert-butylcyclohexyl)peroxydicarbonate, diisopropyl peroxydicarbonate, tert-butylperoxyisopropyl carbonate, dimyristyl peroxycarbonate, 1,1,3,3-tetramethylbutyl neodecanoate, α-cumylperoxy neodecanoate, tert-butylperoxy neodecanoate, 1,1-bis(tert-butylperoxy)cyclohexane, 2,2-bis(4,4-di-tert-butylperoxy-cyclohexyl)propane, 1,1-bis(tert-butylperoxy)cyclododecane, tert-hexylperoxy isopropyl monocarbonate, tert-butylperoxy-3,5,5-trimethylhexanoate, tert-butylperoxy laurate, 2,5-dimethyl-2,5-di(benzoylperoxy)hexane, tert-butylperoxy acetate, 2,2-bis(tert-butylperoxy)butene, tert-butylperoxy benzoate, n-butyl-4,4-4bis(tert-peroxy)valerate, di-tert-butylperoxyisophthalate, dicumyl peroxide, α-α'-bis(tert-butylperoxy-m-isopropyl)benzene, 2,5-dimethyl-2,5-di(tert-butylperoxy)hexane, 1,3-bis(tert-butylperoxydiisopropyl)benzene, tert-butyl cumyl peroxide, di-tert-butyl peroxide, p-menthane hydroperoxide, 2,5-dimethyl-2,5-di(tert-butylperoxy)hexene-3, and bis(tert-butylperoxyisopropyl)benzene, and as the organic peroxide, dicetyl peroxydicarbonate or 1,3-bis(tert-butylperoxyisopropyl)benzene is preferred.

Preferred examples of the polypropylene MM can include:

(1) modified polypropylene obtained by graft-polymerizing maleic anhydride to polypropylene containing a propylene monomer and optionally, an ethylene monomer as a main structural unit; and (2) modified polypropylene obtained by copolymerizing an olefin containing a propylene monomer and optionally, an ethylene monomer as a main component, and methacrylic acid glycidyl ester or maleic anhydride.

In addition, as the polypropylene MM, maleic anhydride-modified polypropylene containing 0.01 to 10 wt % of a polymerizable monomer unit derived from an unsaturated carboxylic acid and/or a derivative thereof is preferred from the viewpoint of mechanical strength such as impact strength, fatigue characteristics, and rigidity of a fiber-reinforced resin molded article. In particular, in a case of polypropylene MM obtained by random-copolymerization or block-copolymerization by using an unsaturated carboxylic acid and a derivative thereof, a content of a polymerizable monomer unit derived from the unsaturated carboxylic acid and/or the derivative thereof is preferably 3 to 10 wt %. In a case of polypropylene MM obtained by graft-polymerization by using an unsaturated carboxylic acid and a derivative thereof, a content of a polymerizable monomer unit derived from the unsaturated carboxylic acid and/or the derivative thereof is preferably 0.01 to 10 wt %.

Content

A content of the oxazoline-modified polypropylene (component 1) contained in the polypropylene composition of the present invention is not particularly limited, and is preferably 1 to 20 mass %, more preferably 3 to 20 mass %, and still more preferably 5 to 20 mass %, with respect to 100 mass % of a total mass of the polypropylene composition of the present invention.

A content of the polypropylene (component 2) contained in the polypropylene composition of the present invention is not particularly limited, and is preferably 30 to 98 mass %, and more preferably 50 to 90 mass %, with respect to 100 mass % of the total mass of the polypropylene composition of the present invention.

A content of the filler (component 3) contained in the polypropylene composition of the present invention is not particularly limited, and is preferably 1 to 50 mass %, more preferably 3 to 40 mass %, and still more preferably 15 to 30 mass %, with respect to 100 mass % of the total mass of the polypropylene composition of the present invention.

A content of the another modified polypropylene (component 4) contained in the polypropylene composition of the present invention is not particularly limited.

In one aspect, the polypropylene composition of the present invention contains the following (component 1):

(component 1) oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min.

In one aspect, the polypropylene composition of the present invention contains the following (component 1):

(component 1) oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min, in which a content of the (component 1) is 1 to 20 mass %.

In one aspect, the polypropylene composition of the present invention contains the following (component 1), (component 2), and (component 3):

(component 1) oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min;

(component 2) polypropylene; and (component 3) at least one filler selected from the group consisting of a carbon fiber, a glass fiber, and talc, in which a content of the (component 1) is 1 to 20 mass %, a content of the (component 2) is 30 to 98 mass %, and a content of the (component 3) is 1 to 50 mass %.

In one aspect, the polypropylene composition of the present invention contains the following (component 1):

(component 1) oxazoline-modified polypropylene produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

In one aspect, the polypropylene composition of the present invention contains the following (component 1):

(component 1) oxazoline-modified polypropylene produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture, in which a content of the (component 1) is 1 to 20 mass %.

In one aspect, the polypropylene composition of the present invention contains the following (component 1), (component 2), and (component 3):

(component 1) oxazoline-modified polypropylene produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture;

(component 2) polypropylene; and (component 3) at least one filler selected from the group consisting of a carbon fiber, a glass fiber, and talc, in which a content of the (component 1) is 1 to 20 mass %, a content of the (component 2) is 30 to 98 mass %, and a content of the (component 3) is 1 to 50 mass %.

Molded Article

The carbon fiber-containing polypropylene composition of the present invention is used, for example, to produce a molded article by the following method.

An example of a method of producing a molded article can include a method including a step of melting and molding the polypropylene composition to obtain a molded article.

Examples of a molding method can include an extrusion molding method and an injection molding method. For example, a sheet-like molded article can be obtained by extrusion molding. An injection molded article can be obtained by injection molding.

Examples of the injection molding method can include a general injection molding method, an injection foam molding method, a supercritical injection foam molding method, an ultrahigh speed injection molding method, an injection compression molding method, a gas-assist injection molding method, a sandwich molding method, a sandwich foam molding method, and an insert•outsert molding method.

Use

The polypropylene composition and the molded article of the present invention can be used as an automobile member such as automobile interior and exterior parts, an automobile part, a two-wheeled automobile part, a housing-related part, a medical device, a robot part, an aircraft part, a household appliance part, an electrical and electronic part, a mechanical part, a power tool part, a food container, sports equipment, or a building material related part.

EXAMPLES

Hereinafter, the present invention will be described in more detail with reference to Examples and Comparative Examples, but the present invention is not limited thereto.

Method of Calculating Bond Component in Surface of Carbon Fiber

Removal of Sizing Agent

A temperature of an accelerated solvent extractor ASE-200 (manufactured by Nippon Dionex K.K.) was set to 80° C., and then 0.2 g of carbon fiber was placed in an extraction cell container having a volume of 11 ml and installed in the accelerated solvent extractor ASE-200. 11 ml of tetrahydrofuran (manufactured by Kanto Chemical Co., Inc., special grade, containing no stabilizer) was injected to the extraction cell container, and then the pressure in the extraction cell container was pressurized to 1,000 psi and held for 15 minutes. About half of the tetrahydrofuran was expelled through a discharge port of the extraction cell container using nitrogen, tetrahydrofuran was injected again until the amount of tetrahydrofuran in the extraction cell container reached 11 ml, and then the pressure in the extraction cell container was pressurized to 1,000 psi and held for 10 minutes. About half of the tetrahydrofuran was expelled once again through the discharge port of the extraction cell container using nitrogen, tetrahydrofuran was injected again until the amount of tetrahydrofuran in the extraction cell container reached 11 ml, and then the pressure in the extraction cell container was pressurized to 1,000 psi and held for 10 minutes. Thereafter, nitrogen was injected to the extraction cell container for 2 minutes, and the tetrahydrofuran was expelled through the discharge port of the extraction cell container. The carbon fiber was removed from the extraction cell container and vacuum drying was performed at 40° C. for at least 15 hours.

X-Ray Photoelectron Spectroscopy (XPS) Analysis

Next, the carbon fiber subjected to the above work was installed in an X-ray photoelectron spectrometer (manufactured by Shimadzu-Kratos Corp., AXIS ULTRA DLD). A monochromatic Al Kα (1,486.6 eV) was used as an X-ray source and used as excitation light. A tube current was set to 10 mA, a tube voltage was set to 15 kV, and a photoelectron take-off angle defined by an angle between a normal direction of the sample and a photoelectron take-off direction was set to 0°, thereby measuring an output. A background of the obtained carbon is spectrum was removed by the Shirley method.

The carbon 1 s spectrum from which the background was removed was waveform-separated for a peak derived from each of a C—C bond component, a C—N bond component, a C—O bond component, a C═O bond component, and an O—C═O bond component, by using a Gauss-Lorentz complex function in which a ratio of a Lorentz function was set to 30%, according to a method described in Composites: Part A 90 (2016) 653-661 (Bo Gao et al.).

A spectrum area of each of the C—C bond component, the C—N bond component, the C—O bond component, the C═O bond component, and the O—C═O bond component obtained by the waveform separation was determined, and a ratio of the spectrum area of the C—O bond component and a ratio of a total amount of the spectrum area of the C═O bond component and the spectrum area of the O—C═O bond component with respect to 100% of a total amount of the C—C bond component, the C—N bond component, the C—O bond component, the C═O bond component, and the O—C═O bond component were calculated.

Examples of Oxazoline-Modified Polypropylene

Example M1: Oxazoline-Modified Polypropylene-1

M1-1) Maleic Anhydride-Modified Polypropylene-1

Maleic anhydride-modified polypropylene-1 was produced using Synthesis Example 2 described in WO 2020/009090 A.

M1-2) Oxazoline-Modified Polypropylene-1

100 parts by mass of the maleic anhydride-modified polypropylene-1 synthesized above, 0.46 parts by mass of an oxazoline compound (trade name: CP resin A 1,3-PBO, manufactured by MIKUNI PHARMACEUTICAL INDUSTRIAL CO., LTD.), 0.2 parts by mass of an antioxidant 1 (SUMILIZER GA80, manufactured by Sumitomo Chemical Co., Ltd.), and 0.2 parts by mass of an antioxidant 2 (SUMILIZER GP, manufactured by Sumitomo Chemical Co., Ltd.) were mixed with each other, and the mixture was melted and kneaded while degassing from a vacuum vent with a twin screw kneader (KZW12TW-60/75 mg-NH, screw diameter: 12 mm, L/D=75, cylinder temperature: 250° C., rotation speed: 300 rpm, discharge: 2 kg/hr, manufactured by TECHNOVEL CORPORATION), thereby obtaining oxazoline-modified polypropylene-1. An MFR (230° C. and load of 2.16 kg) of the obtained oxazoline-modified polypropylene-1 was 152 g/10 min.

Examples M2 to M4: Oxazoline-Modified Polypropylene-2 to Oxazoline-Modified Polypropylene-4

Oxazoline-modified polypropylene-2 to oxazoline-modified polypropylene-4 of Examples M2 to M4 were produced in the same manner as that of the oxazoline-modified polypropylene-1, except that the materials shown in Table 1 were used.

TABLE 1

Mixing amount of oxazoline compound in production of oxazoline-modified polypropylenes-1 to 4

| | Oxazoline-modified polypropylene-1 | Oxazoline-modified polypropylene-2 | Oxazoline-modified polypropylene-3 | Oxazoline-modified polypropylene-4 |
|---|---|---|---|---|
| Maleic anhydride-modified polypropylene-1 | 100 | 100 | 100 | 100 |
| Oxazoline Compound | 0.46 | 1.4 | 2.3 | 3.2 |

Examples M5 to M7: Oxazoline-Modified Polypropylene-5 to Oxazoline-Modified Polypropylene-7

Oxazoline-modified polypropylene-5 to oxazoline-modified polypropylene-7 of Examples M5 to M7 were produced in the same manner as that of the oxazoline-modified polypropylene-1, except that the materials shown in Table 2 were used.

The following maleic anhydride-modified polypropylene was used for the maleic anhydride-modified polypropylene-2.

Maleic anhydride-modified polypropylene-2: Bondyram 1001 manufactured by Polyram Plastic Industries Ltd.

MFR (230° C. and load of 21.2 N): 315 g/10 min

TABLE 2

Mixing amount of oxazoline compound in production of oxazoline-modified polypropylenes-5 to 7

| | Oxazoline-modified polypropylene-5 | Oxazoline-modified polypropylene-6 | Oxazoline-modified polypropylene-7 |
|---|---|---|---|
| Maleic anhydride-modified polypropylene-2 | 100 | 100 | 100 |
| Oxazoline Compound | 0.46 | 0.76 | 1.39 |

Comparative Example M8: Oxazoline-Modified Polypropylene-8

100 parts by mass of maleic anhydride-modified polypropylene-3, 2.35 parts by mass of an oxazoline compound (trade name: CP resin A 1,3-PBO, manufactured by MIKUNI PHARMACEUTICAL INDUSTRIAL CO., LTD.), 0.2 parts by mass of an antioxidant 1 (SUMILIZER GA80, manufactured by Sumitomo Chemical Co., Ltd.), and 0.2 parts by mass of an antioxidant 2 (SUMILIZER GP, manufactured by Sumitomo Chemical Co., Ltd.) were mixed with each other, and the mixture was melted and kneaded while degassing from a vacuum vent with a twin screw kneader (KZW12TW-60/75 mg-NH, screw diameter: 12 mm, L/D=75, cylinder temperature: 200° C., rotation speed: 300 rpm, discharge: 1.5 kg/hr, manufactured by TECHNOVEL CORPORATION), thereby obtaining oxazoline-modified polypropylene-8. An MFR (230° C. and load of 2.16 kg) of the obtained oxazoline-modified polypropylene-8 was 648 g/10 min.

The following maleic anhydride-modified polypropylene was used for the maleic anhydride-modified polypropylene-3.

Maleic anhydride-modified polypropylene-3: UMEX 1010, manufactured by Sanyo Chemical Industries, Ltd.

TABLE 3

Mixing amount of oxazoline compound in production of oxazoline-modified polypropylene-8

| | Oxazoline-modified polypropylene-8 |
|---|---|
| Maleic anhydride-modified polypropylene-3 | 100 |
| Oxazoline Compound | 2.35 |

Relationship Between Standardized Absorbance Derived from Oxazoline Group and Content of Oxazoline Group in Oxazoline-Containing Polypropylene Homopolymer An oxazoline compound (trade name: CP resin A 1,3-PBO, manufactured by MIKUNI PHARMACEUTICAL INDUSTRIAL CO., LTD.) and a polypropylene homopolymer 1 (NOBLEN HR100EG, manufactured by Sumitomo Chemical Co., Ltd.) were melted and kneaded using a kneader (LABO PLASTOMILL, manufactured by TOYO SEIKI Co., Ltd.). A plurality of oxazoline-containing polypropylene homopolymers were obtained by changing a mixing ratio of the oxazoline compound to the polypropylene homopolymer 1. A content of the oxazoline group in the oxazoline-containing polypropylene homopolymer was calculated from a content of the oxazoline compound in the obtained oxazoline-containing polypropylene homopolymer. Next, the obtained sample was preheated at 210° C. for 5 minutes, and a pressure of 5 MPa was applied for 5 minutes, thereby preparing a sample having a thickness of 300 μm by press molding. A transmission spectrum of the produced molded article at a wavenumber of 600 to 4,000 $cm^{-1}$ was measured using a Fourier transform infrared spectrophotometer (FT/IR, 6200, manufactured by JASCO Corporation). Using an absorbance $I_A$ of 1,655 $cm^{-1}$ and an absorbance $I_B$ of 841 $cm^{-1}$ derived from the oxazoline group having the obtained IR spectrum, the absorbance derived from the oxazoline group in the oxazoline-containing polypropylene homopolymer was normalized by the following Equation (1), and the normalized absorbance was defined as $\alpha_A$. Calibration curves of $\alpha_A$ and the content of the oxazoline group were created using $\alpha_A$ and the content of the oxazoline group in the oxazoline-containing polypropylene homopolymer. A relationship between $\alpha_A$ and the content (Xmmol/g) of the oxazoline group obtained from the created calibration curves was represented by the following Equation (2).

$$\alpha_A = I_A/I_B \tag{1}$$

$$X = 0.3849 \times \alpha_A \tag{2}$$

Method of Calculating Content of Oxazoline Group in 1 g of Oxazoline-Modified Polypropylene The maleic anhydride-modified polypropylene used in synthesis of the oxazoline-modified polypropylene was preheated at 190° C. for 5 minutes, and a pressure of 5 MPa was applied for 5 minutes, thereby preparing a sample having a thickness of 100 μm by press molding. 0.3 g of the produced press-molded article was cut out, and the cut molded article was put into 30 ml of ethanol. Next, the molded article was allowed to stand at 30° C. for 60 hours, a sample was collected by filtration, and the collected sample was air-dried and then vacuum-dried at room temperature for at least 18 hours. The obtained sample was preheated at 210° C. for 5 minutes, and a pressure of 5 MPa was applied for 5 minutes, thereby preparing a sample having a thickness of 100 μm to 300 μm by press molding. A transmission spectrum of the produced press-molded article at a wavenumber of 600 to 4,000 $cm^{-1}$ was measured using a Fourier transform infrared spectrophotometer (FT/IR, 6200, manufactured by JASCO Corporation). Using an absorbance $I_C$ and an absorbance of $I_D$ having wavenumbers of 1,655 $cm^{-1}$ and 841 $cm^{-1}$, respectively, in the obtained spectrum, the absorbance was normalized by the following Equation (3), and the normalized absorbance was defined as $\alpha_B$.

A press-molded article was produced in the same procedure as in the oxazoline-modified polypropylene, and a transmission spectrum was measured using FT/IR. Using an absorbance $I_E$ and an absorbance of $I_F$ having wavenumbers of 1,655 $cm^{-1}$ and 841 $cm^{-1}$, respectively, in the obtained spectrum, the absorbance derived from the oxazoline group in the oxazoline-modified polypropylene was normalized by the following Equation (4), and the normalized absorbance was defined as $\alpha_C$. An absorbance $\alpha_D$ derived from the oxazoline group in the oxazoline-modified polypropylene was calculated by the following Equation (5) using $\alpha_B$ and $\alpha_C$. A content (Ymmol/g) of the oxazoline group in 1 g of the oxazoline-modified polypropylene was calculated from $\alpha_D$ and Equation (2).

$$\alpha_B = I_C / I_D \quad (3)$$

$$\alpha_C = I_E / I_F \quad (4)$$

$$\alpha_D = \alpha_C - \alpha_B \quad (5)$$

$$Y = 0.3849 \times \alpha_D \text{ (mmol/g)} \quad (6)$$

Used Materials

The following materials were used in Examples and Comparative Examples.

1. Oxazoline-Modified Polypropylene (Component 1)
 Oxazoline-modified polypropylene-1
 Oxazoline-modified polypropylene-1 of the above Example
 MFR (230° C. and load of 21.2 N): 152 g/10 min
 Content of oxazoline group: $2.0 \times 10^{-2}$ mmol/g
 Oxazoline-modified polypropylene-2
 Oxazoline-modified polypropylene-2 of the above Example
 MFR (230° C. and load of 21.2 N): 41 g/10 min
 Content of oxazoline group: $11.2 \times 10^{-2}$ mmol/g
 Oxazoline-modified polypropylene-3
 Oxazoline-modified polypropylene-3 of the above Example
 MFR (230° C. and load of 21.2 N): 6.9 g/10 min
 Content of oxazoline group: $19.0 \times 10^{-2}$ mmol/g
 Oxazoline-modified polypropylene-4
 Oxazoline-modified polypropylene-4 of the above Example
 MFR (230° C. and load of 21.2 N): 2.3 g/10 min
 Content of oxazoline group: $20.7 \times 10^{-2}$ mmol/g
 Oxazoline-modified polypropylene-5
 Oxazoline-modified polypropylene-5 of the above Example
 MFR (230° C. and load of 21.2 N): 275 g/10 min
 Content of oxazoline group: $0.2 \times 10^{-2}$ mmol/g
 Oxazoline-modified polypropylene-6
 Oxazoline-modified polypropylene-6 of the above Example
 MFR (230° C. and load of 21.2 N): 238 g/10 min
 Content of oxazoline group: $3.1 \times 10^{-2}$ mmol/g
 Oxazoline-modified polypropylene-7
 Oxazoline-modified polypropylene-7 of the above Example
 MFR (230° C. and load of 21.2 N): 162 g/10 min
 Content of oxazoline group: $6.4 \times 10^{-2}$ mmol/g Modified Polypropylene of Comparative Example C1
 Maleic anhydride-modified polypropylene-1 used in synthesis of Example M1
 MFR (230° C. and load of 21.2 N): 199 g/10 min
 Content of oxazoline group: $0.0 \times 10^{-2}$ mmol/g Modified Polypropylene of Comparative Examples C2 and C3
 Oxazoline-modified polypropylene-8
 MFR (230° C. and load of 21.2 N): 648 g/10 min
 Content of oxazoline group: $14.9 \times 10^{-2}$ mmol/g 2. Polypropylene (Component 2)
 Polypropylene homopolymer 1 (manufactured by Sumitomo Chemical Co., Ltd., NOBLEN HR100EG)
 MFR (230° C., load of 21.2 N): 23 g/10 min
 Melting point: 164° C.
3. Filler (Component 3)
 Carbon fiber 1 (manufactured by Carbon Fiber Recycle Industry Co., Ltd., CFRI T8S103C)
 C—O bond: 5.2%, total of C═O bond and O—C═O bond: 5.8%
 Glass Fiber 1 (CS 249A-10C, manufactured by Owens Corning)
4. Other Materials
 Antioxidant 3: manufactured by BASF Japan Ltd., Irganox 1010
 Antioxidant 4: manufactured by BASF Japan Ltd., Irgafos 168
 Neutralizer: Calcium stearate, manufactured by SUN ACE CORPORATION Melting and Kneading and Production of Injection Molded Article

Example C1

70 mass % of the polypropylene homopolymer 1, 10 mass % of the oxazoline-modified polypropylene-1, and 20 mass % of the carbon fiber 1, and 0.2 parts by mass of the antioxidant 3 and 0.2 parts by mass of the antioxidant 4 with respect to 100 parts by mass of the total of the polypropylene homopolymer 1, the oxazoline-modified polypropylene-1, and the carbon fiber 1 were mixed with each other to obtain a mixture. The mixture was melted and kneaded with a 40 mm single screw extruder (VS40-28 head type extruder, manufactured by TANABE PLASTICS MACHINERY CO., LTD.) at a cylinder temperature of 220° C. and a screw rotation speed of 100 rpm, and the mixture was pelletized, thereby obtaining a polypropylene composition. The obtained polypropylene composition was subjected to injection molding using an injection molding machine (M-70CSJ, manufactured by Meiki Co., Ltd.) under conditions of a cylinder temperature of 220° C., a mold temperature of 50° C., and an injection speed of 20 mm/sec, thereby obtaining an injection molded article of an ISO test piece.

Examples C2 to C7 and Comparative Examples C1 and C2

Polypropylene compositions of Examples C2 to C7 and Comparative Examples C1 and C2 were produced in the same manner as that of Example C1, except that materials shown in Table 4 were used. The maleic anhydride-modified polypropylene used for the production of the polypropylene of Comparative Example 1 was described in the column of "Component 1" for convenience.

Example C8

58.5 mass % of the polypropylene homopolymer 1, 1.5 mass % of the oxazoline-modified polypropylene-2, and 40 mass % of the glass fiber 1, and 0.2 parts by mass of the antioxidant 3, 0.2 parts by mass of the antioxidant 4, and 0.05 parts by mass of the neutralizer with respect to 100 parts by mass of the total of the polypropylene homopolymer 1, the oxazoline-modified polypropylene-2, and the glass fiber 1 were mixed with each other to obtain a mixture. The mixture was melted and kneaded with a 32 mm twin screw extruder (twin extruder ZSK32Mc18, manufactured by Coperion GmbH) at a cylinder temperature of 230° C. and a screw rotation speed of 400 rpm, and the mixture was pelletized, thereby obtaining a polypropylene composition. The obtained polypropylene composition was subjected to injection molding using an injection molding machine (M-70CSJ, manufactured by Meiki Co., Ltd.) under conditions of a cylinder temperature of 220° C., a mold temperature of 50° C., and an injection speed of 20 mm/sec, thereby obtaining an injection molded article of an ISO test piece.

Comparative Example C3

A polypropylene composition of Comparative Example C3 was produced in the same manner as that of Example C8, except that the materials shown in Table 5 were used.

Evaluation of Physical Properties

1. Melt Mass Flow Rate (Unit: g/10 min)

A melt mass flow rate was measured at a measurement temperature of 230° C. and a load of 2.16 kg according to a method specified in JIS K 7210.

2. Density (Unit: g/cm$^3$)

Using the molded article molded by the molding method described in "Melting and Kneading and Production of Injection Molded Article" and cut into a size of 80 mm×10 mm×4 mm as a test piece, a density was measured according to a water replacement method which is the A method specified in JIS K7112.

3. Ultimate Tensile Strength (Unit: MPa)

Using the test piece having a thickness of 4 mm molded by the molding method described in "Melting and Kneading and Production of injection Molded Article", a ultimate tensile strength (US) was measured at a tensile speed of 50 mm/min according to a method specified in ISO 527-2.

4. Flexural Strength (Unit: MPa)

Using the test piece having a thickness of 4 mm molded by the molding method described in "Melting and Kneading and Production of injection Molded Article", a flexural strength (FS) was measured at a loading speed of 2.0 mm/min according to a method specified in ISO 178.

5. Notched Charpy Impact Strength (Unit: kJ/m$^2$)

The molded article molded by the molding method described in "Melting and Kneading and Production of Injection Molded Article" was cut into a size of 80 mm×10 mm×4 mm, and a notched Charpy impact strength by an edgewise impact was measured according to a method specified in ISO 179-1 using a notched material as a test piece. The shape of the notch was a shape A described in ISO 179-1.

TABLE 4

| | | Physical properties of modified polypropylene | | Example | | | | | | | Comparative Example | |
|---|---|---|---|---|---|---|---|---|---|---|---|---|
| | | MFR@230° C. (g/10 min) | Content of oxazoline group (mmol/g × $10^{-2}$) | C1 | C2 | C3 | C4 | C5 | C6 | C7 | C1 | C2 |
| Component 1 | Oxazoline-modified polypro-pylene-1 | 152 | 2.0 | 10 | | | | | | | | |
| | Oxazoline-modified polypro-pylene-2 | 41 | 11.2 | | 10 | | | | | | | |
| | Oxazoline-modified polypro-pylene-3 | 6.9 | 19.0 | | | 10 | | | | | | |
| | Oxazoline-modified polypro-pylene-4 | 2.3 | 20.7 | | | | 10 | | | | | |
| | Oxazoline-modified polypro-pylene-5 | 275 | 0.2 | | | | | 10 | | | | |
| | Oxazoline-modified polypro-pylene-6 | 238 | 3.1 | | | | | | 10 | | | |
| | Oxazoline-modified polypro-pylene-7 | 162 | 6.4 | | | | | | | 10 | | |
| | Oxazoline-modified polypro-pylene-8 | 648 | 14.9 | | | | | | | | | 10 |
| | Maleic anhydride-modified polypro-pylene-1 | 199 | 0 | | | | | | | | 10 | |

TABLE 4-continued

| | | Physical properties of modified polypropylene: MFR@230° C. (g/10 min) | Physical properties of modified polypropylene: Content of oxazoline group (mmol/g × $10^{-2}$) | Example C1 | Example C2 | Example C3 | Example C4 | Example C5 | Example C6 | Example C7 | Comparative Example C1 | Comparative Example C2 |
|---|---|---|---|---|---|---|---|---|---|---|---|---|
| Component 2 | Polypropylene homopolymer 1 | | | 70 | 70 | 70 | 70 | 70 | 70 | 70 | 70 | 70 |
| Component 3 | Carbon fiber 1 | | | 20 | 20 | 20 | 20 | 20 | 20 | 20 | 20 | 20 |
| Ultimate tensile strength (MPa) | | | | 124 | 132 | 126 | 123 | 119 | 123 | 126 | 121 | 101 |
| Flexural strength (MPa) | | | | 172 | 187 | 175 | 172 | 177 | 181 | 185 | 169 | 146 |
| Notched Charpy impact strength @ 23° C. (kJ/m$^2$) | | | | 7.0 | 7.8 | 7.0 | 6.6 | 6.3 | 6.3 | 6.5 | 6.4 | 5.1 |
| Notched Charpy impact strength @ −30° C. (kJ/m$^2$) | | | | 5.0 | 5.3 | 5.1 | 5.3 | 4.9 | 4.9 | 4.9 | 5.0 | 5.1 |
| Density (g/cm$^3$) | | | | 0.995 | 0.992 | 0.997 | 0.996 | 0.991 | 0.992 | 0.992 | 0.993 | 0.995 |
| MFR (g/10 min) | | | | 2.8 | 1.9 | 2.4 | 1.8 | 3.9 | 3.7 | 3.0 | 2.3 | 1.4 |

TABLE 5

| | | Physical properties of modified polypropylene: MFR@230° C. (g/10 min) | Physical properties of modified polypropylene: Content of oxazoline group (mmol/g × $10^{-2}$) | Example C8 | Comparative Example C3 |
|---|---|---|---|---|---|
| Component 1 | Oxazoline-modified polypropylene-2 | 41 | 11.2 | 1.5 | |
| | Oxazoline-modified polypropylene-8 | 648 | 14.9 | | 1.5 |
| Component 2 | Polypropylene homopolymer 1 | | | 58.5 | 58.5 |
| Component 3 | Glass fiber 1 | | | 40 | 40 |
| Ultimate tensile strength(MPa) | | | | 130 | 105 |
| Flexural strength (MPa) | | | | 194 | 157 |
| Notched Charpy impact strength @ 23° C. (kJ/m$^2$) | | | | 13.4 | 7.5 |
| Notched Charpy impact strength @ −30° C. (kJ/m$^2$) | | | | 15.9 | 8.5 |
| Density (g/cm$^3$) | | | | 1.214 | 1.211 |
| MFR (g/10 min) | | | | 3.6 | 3.8 |

What is claimed is:

1. Oxazoline-modified polypropylene satisfying the following requirements (1), (1-a), and (2):

(1) the oxazoline-modified polypropylene has an oxazoline group;

(1-a) a content of the oxazoline group in 1 g of the oxazoline-modified polypropylene is $0.1\times10^{-2}$ to $100\times10^{-2}$ mmol/g; and (2) a melt mass flow rate of the oxazoline-modified polypropylene is 0.01 to 300 g/10 min, wherein the oxazoline-modified polypropylene is further maleic anhydride-modified.

2. Oxazoline-modified polypropylene of claim 1 produced by a method comprising the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

3. A method of producing oxazoline-modified polypropylene of claim 1, the method comprising the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

4. A polypropylene composition comprising the following (component 1):

(component 1) oxazoline-modified polypropylene of claim 1 satisfying the following requirements (1), (1-a), and (2):

(1) the oxazoline-modified polypropylene has an oxazoline group;

(1-a) a content of the oxazoline group in 1 g of the oxazoline-modified polypropylene is $0.2\times10^{-2}$ to $25\times10^{-2}$ mmol/g; and (2) a melt mass flow rate of the oxazoline-modified polypropylene is 0.01 to 300 g/10 min.

5. A polypropylene composition comprising the following (component 1):

(component 1) oxazoline-modified polypropylene of claim 1 produced by a method including the following steps of:

melting and kneading polypropylene, an organic peroxide, and maleic acid or maleic anhydride to obtain a melt-kneaded product; and adding an oxazoline compound to the obtained melt-kneaded product of the polypropylene, the organic peroxide, and the maleic acid or maleic anhydride to obtain a mixture and melting and kneading the mixture.

6. The polypropylene composition according to claim 4, further comprising the following (component 2) and (component 3):

(component 2) polypropylene; and (component 3) at least one filler selected from the group consisting of a carbon fiber, a glass fiber, and talc, wherein a content of the (component 1) is 1 to 20 mass %, a content of the (component 2) is 30 to 98 mass %, and a content of the (component 3) is 1 to 50 mass % based on a total mass of the composition being 100 mass %.

7. The polypropylene composition according to claim 4, further comprising a carbon fiber as a (component 3) filler.

8. The polypropylene composition according to claim 6, wherein the carbon fiber has a C—O bond content of 1 to 24%.

9. The polypropylene composition according to claim 6, wherein the content of the (component 1) is 3 to 20 mass %.

* * * * *